United States Patent [19]
Paulson et al.

[11] Patent Number: 5,449,074
[45] Date of Patent: Sep. 12, 1995

[54] BICYLE RACK

[75] Inventors: Lyle Paulson, Clarks Grove; Neil M. Berg, Albert Lea, both of Minn.; Edward Brown, Denville, N.J.

[73] Assignee: Joyce/Streater, Inc., Albert Lea, Minn.

[21] Appl. No.: 276,828

[22] Filed: Jul. 18, 1994

[51] Int. Cl.6 ................................................ A47F 7/00
[52] U.S. Cl. ........................................ 211/24; 211/22
[58] Field of Search .................... 211/17, 20, 24, 5, 19, 211/22

[56] References Cited

U.S. PATENT DOCUMENTS

| | | | |
|---|---|---|---|
| 481,751 | 8/1892 | Engler | 211/20 X |
| 621,819 | 3/1899 | Ivatt . | |
| 626,535 | 6/1899 | Gradlmiller . | |
| 636,324 | 11/1899 | Ehrenberg . | |
| 639,991 | 12/1899 | Jewell . | |
| 3,116,836 | 1/1964 | McCauley | 211/24 X |
| 3,861,533 | 1/1975 | Radek . | |
| 3,883,002 | 5/1975 | Moore . | |
| 3,901,421 | 8/1975 | Kalicki et al. . | |
| 4,015,718 | 4/1977 | Bernard . | |
| 4,416,379 | 11/1983 | Graber . | |
| 4,733,810 | 3/1988 | Graber et al. . | |

Primary Examiner—Alvin C. Chin-Shue
Assistant Examiner—Sarah L. Purol
Attorney, Agent, or Firm—Jacobson & Johnson

[57] ABSTRACT

A bicycle rack for supporting bicycles of different sizes in an upright position to permit viewing by a retail store customer with the bicycle rack having a frame with a plurality of tire channels locate on the frame, with the tire channels having sidewall for laterally restraining a bicycle tire therein and a first fixed wheel stop located in the channel for preventing movement of a bicycle in one direction along the channel and a movable wheel stop positionable along the channel with the movable wheel stop having a hand lever with a cam for engaging the movable wheel stop with the tire channel to secure the movable wheel stop to the channel with the hand lever disengageable or engageable without the aid of tools to permit a user to remove a bicycle from the rack, place a bicycle in the bicycle rack or reposition the movable wheel stop to accommodate a bicycle of different length by sliding the movable wheel stop to a different position on the channel and then locking the movable wheel stop in position by engaging the hand lever to clamp the movable wheel stop to the channel.

9 Claims, 3 Drawing Sheets

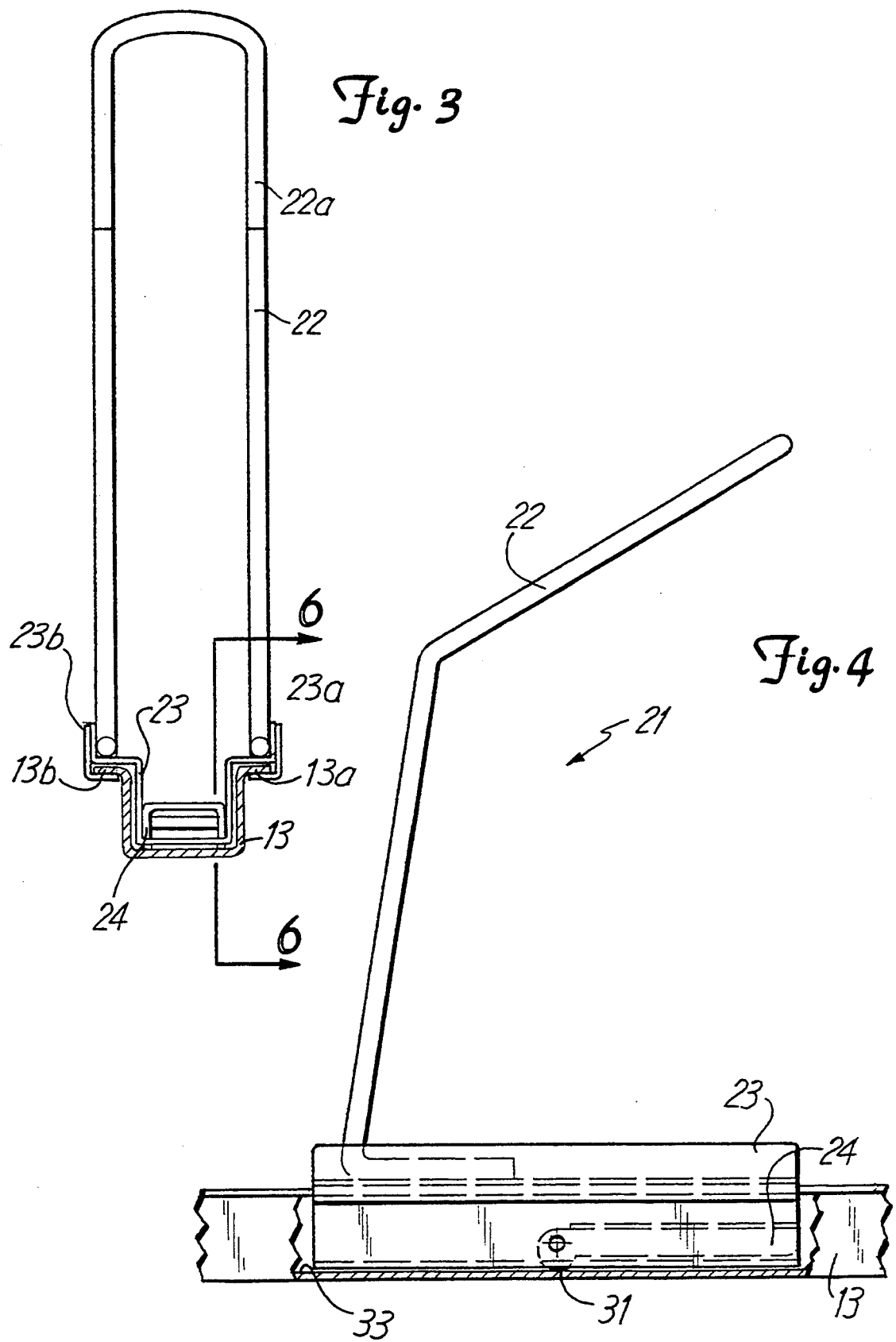

BICYLE RACK

FIELD OF THE INVENTION

This invention relates generally to bicycle racks, and more specifically, to in-store bicycle racks for different size bicycles which need no tools to adjust, release or fasten a bicycle in the bicycle rack.

BACKGROUND OF THE INVENTION

The general concept of bicycle rocks for displaying bicycles in a retail store is well known in the art. Typically, one type of rack uses a U-shaped tire channel with straps for holding the bicycle wheels in the tire channel. The difficulty with some in-store bicycle racks is that not only are they cumbersome but they require special tools to adjust, release or fasten a bicycle in the rack. Special tools can become lost as well as making it more difficult to place or remove a bicycle from the bicycle rack.

The present invention solves the problem by providing a modular bicycle rack with a movable wheel stop which allows one to adjust, release or fasten the movable wheel stop to the tire channel by merely raising or lowering a lever without the aid of any hand tools.

DESCRIPTION OF THE PRIOR ART

U.S. Pat. No. 3,861,533 shows a bicycle rack having a wheel support which is supported by screws.

U.S. Pat. No. 3,863,167 shows a rack for vehicles in which the rack supports the frame of the bicycle. In another embodiment, the bicycle rests on an L-shaped track with the bar extending through the spokes to hold the bicycle in position.

U.S. Pat. No. 639,991 shows a bicycle rack holder which swings out from the wall with a strap 19 for holding the bicycle wheel in the tire channel.

U.S. Pat. No. 626,535 shows a cycle hanger with a U-shaped member extending over the wheel to hold a cycle in a vertical position along a wall.

U.S. Pat. No. 4,416,379 shows a bicycle storage device for holding a bicycle in a vertical position along a wall with members for attaching to the wheels.

U.S. Pat. No. 3,883,002 shows a swinging bicycle rack with a permanently mounted latch for securing the wheel in the channel support.

U.S. Pat. No. 4,015,718 shows a bicycle rack with a channel with a support plate having multiple holes for providing hanging support with the wheel in the bicycle.

U.S. Pat. No. 4,733,810 shows a bicycle rack for the top of a vehicle in which straps are used to secure a bicycle wheels in the channel and a bracket is used for support of a bicycle.

U.S. Pat. No. 621,819 shows a bicycle rack which is partially supported by the handle bars and partially supported by a rubber which engages the rear wheel.

U.S. Pat. No. 636,324 shows a bicycle storage rack in which radial channels provide support for a bicycle.

U.S. Pat. No. 3,901,421 shows a bicycle rack for attachment to the rear of an automobile with channels for supporting the wheels and uprights for engaging the frame of the bicycle.

BRIEF SUMMARY OF THE INVENTION

Briefly, the invention comprises a bicycle rack for supporting bicycles of different sizes in an upright position to permit viewing by a retail store customer with the bicycle rack having a frame with a plurality of horizontal tire channels locate on the frame. The tire channels have sidewalls for laterally restraining a bicycle fire therein and a first wheel stop located in one end of the tire channel for preventing movement of a bicycle in one direction along the tire channel and a movable wheel stop positionable along the tire channel to prevent movement of the bicycle in the opposite direction along the tire channel. The movable wheel stop has a hand lever to quickly secure the movable wheel stop to the tire channel with the hand lever disengageable or engageable from the fire channel without the aid of tools to permit a user to remove a bicycle from the rack, place a bicycle in the bicycle rack or reposition the movable wheel stop to accommodate a bicycle of different length solely by engaging a cam with the tire channel. The movable wheel stop is positioned on the tire channel and then locked into position by engaging a hand lever which clamps lateral flanges of tire channel to flanges on the movable wheel stop.

BRIEF DESCRIPTION OF THE DRAWINGS

FIG. 3 is a rear view of the movable wheel stop;

FIG. 4 is a side view and partial cut-away section showing the wheel stop locked in position;

DESCRIPTION OF THE PREFERRED EMBODIMENT

Figure 1:
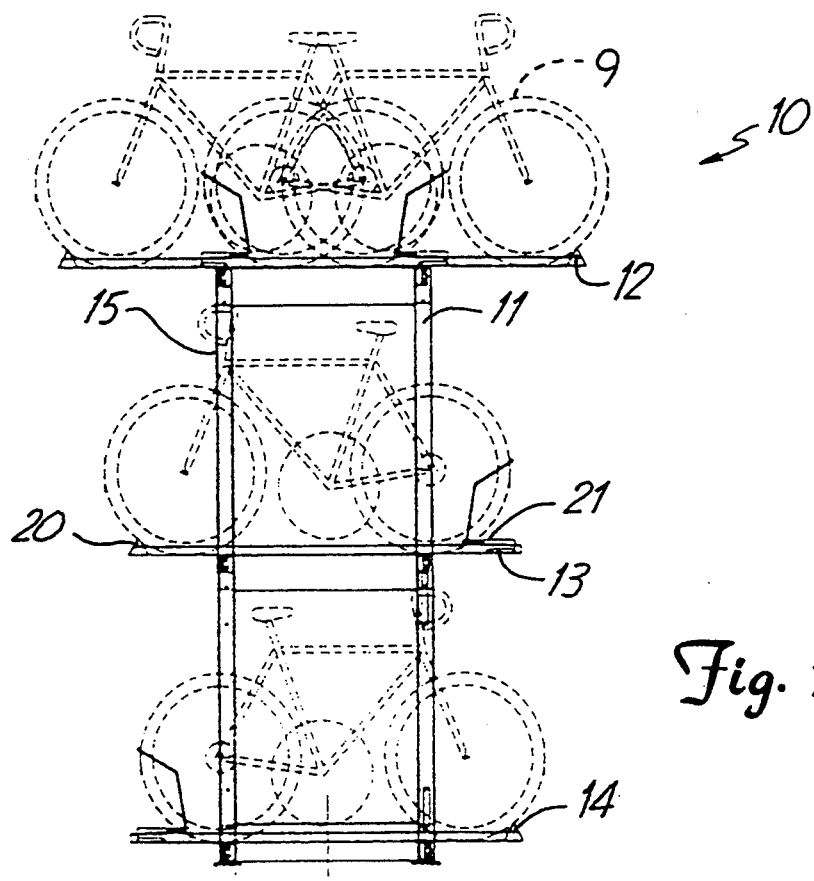
FIG. 1 is a front view showing a bicycle stand of the present invention with tire channels and movable stops for supporting the wheels of a bicycle.

Referring to FIG. 1 reference numeral 10 generally identifies the bicycle rack of the present invention. Bicycle rack 10 includes a plurality of bicycles which are indicated in phantom by reference numeral 9. Bicycle rack 10 comprises a plurality of upright support members 11 and 15 and a plurality of U-shaped time channels 12, 13 and 14. While only one set of upright members and tire channels is visible, other tire channels and upright members located therebehind provide support for additional bicycles. Located at one end of tire channel 13 is a permanent wheel stop 20 and located at the other end is a movable stop 21. Permanent wheel stop 20 comprises a triangular shaped wedge that is secured to tire channel 13 to form rolling resistance to a bicycle rolling out of the tire channel 13. The hand-operable lever 24 in movable stop 21 permits a store employee, without the aid of tools, to disengage, engage or reposition the movable wheel stop 21. Each of the tire channels includes a permanent stop 20 and a hand-operable movable wheel stop 21 to restrain a bicycle from movement along tire channel 13. As all the movable stops and all the tire channels are identical, only one movable stop and one tire channel will be described herein.

Figure 2:
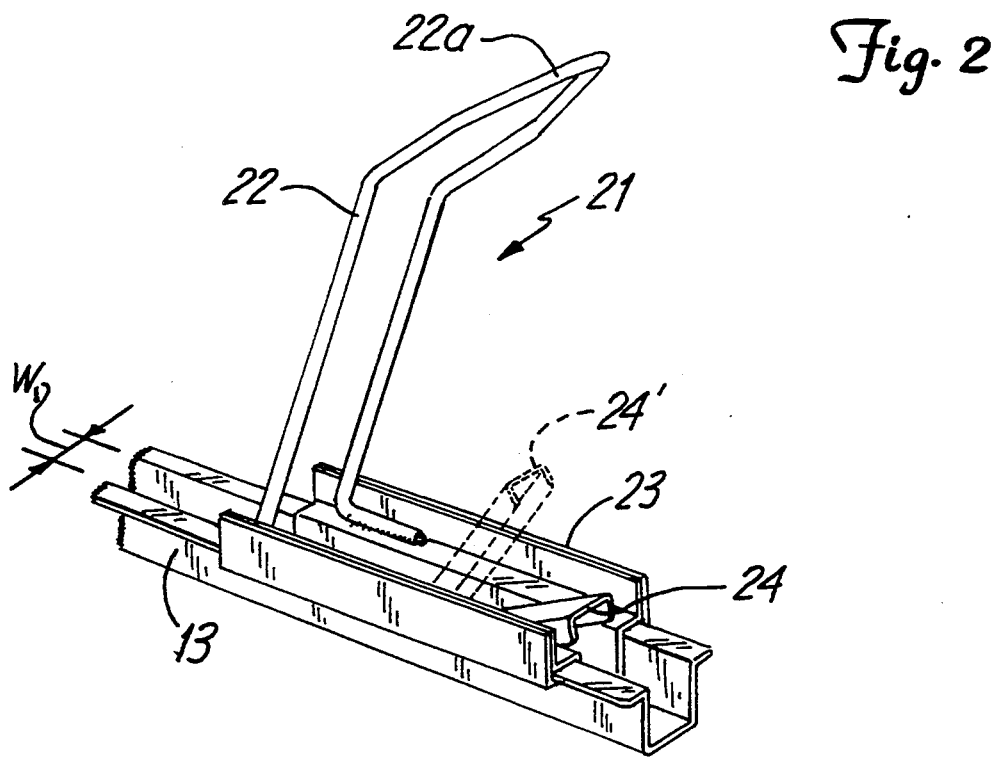
FIG. 2 shows a perspective view of the movable wheel stop of the present invention.

FIG. 2 reference numeral 21 identifies the movable wheel stop comprising a wire-frame wheel support 22 which extends upward from a movable U-shaped channel 23. The lower end of wire-frame wheel support 22 is welded or otherwise secured to movable channel 23.

The U-shaped wire-frame wheel support 22 has a top portion 22a for engaging the sides of a bicycle tire to hold the bicycle in an upright position in tire channel 13. Tire channel 13 has a sufficiently wide opening $w_1$ so that the tire of the bicycle fits into the U-shaped tire channel 13 to prevent lateral movement of the bicycle tire. Moveable channel 23 has a shape that mates with tire channel 13 to permit sliding of moveable channel 23 along tire channel 13.

FIG. 2 shows a hand-operable hand lever 24 which can be moved from a lower locked position in lower channel 13 to an unlocked upper position 24' to prevent movement of movable stop 21 along tire channel 13. Movable stop 21 is shown in further detail in FIGS. 3–6.

FIG. 3 shows a rear elevation view with hand lever 24 in the locked position with the lateral flanges 13a and 13b of tire channel 13 located in the pockets formed between the double flanges formed by L-shaped members 23a and 23b and movable channel 23. The double flanges ensure that whether in the unlocked or locked position the moveable wheel stop 21 will remain in engagement with the tire channel 13 and prevent a bicycle wheel from falling out of tire channel 13.

FIG. 4 shows a side view with channel 23 partially cut away revealing cam 31 on lever 24 engaging a bottom surface 33 of tire channel 13.

Figure 5:
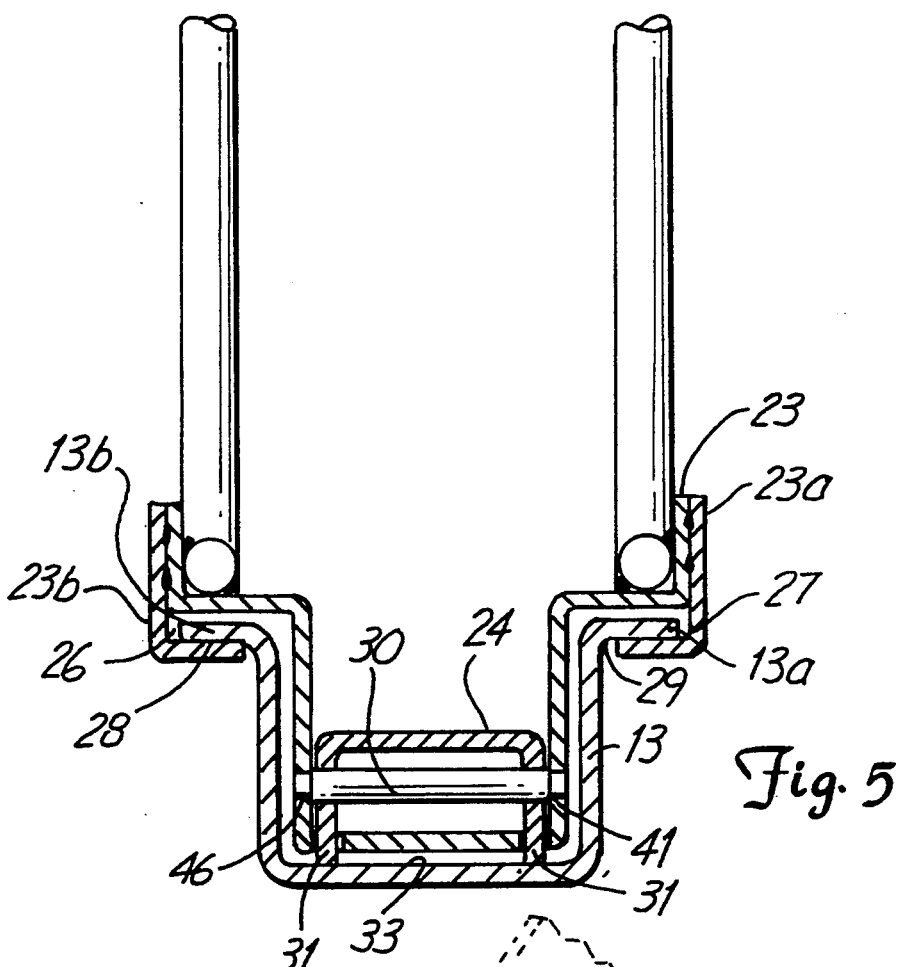
FIG. 5 is an enlarged sectional view showing the movable stop locked to the wheel tire channel in the stand.
Figure 6:
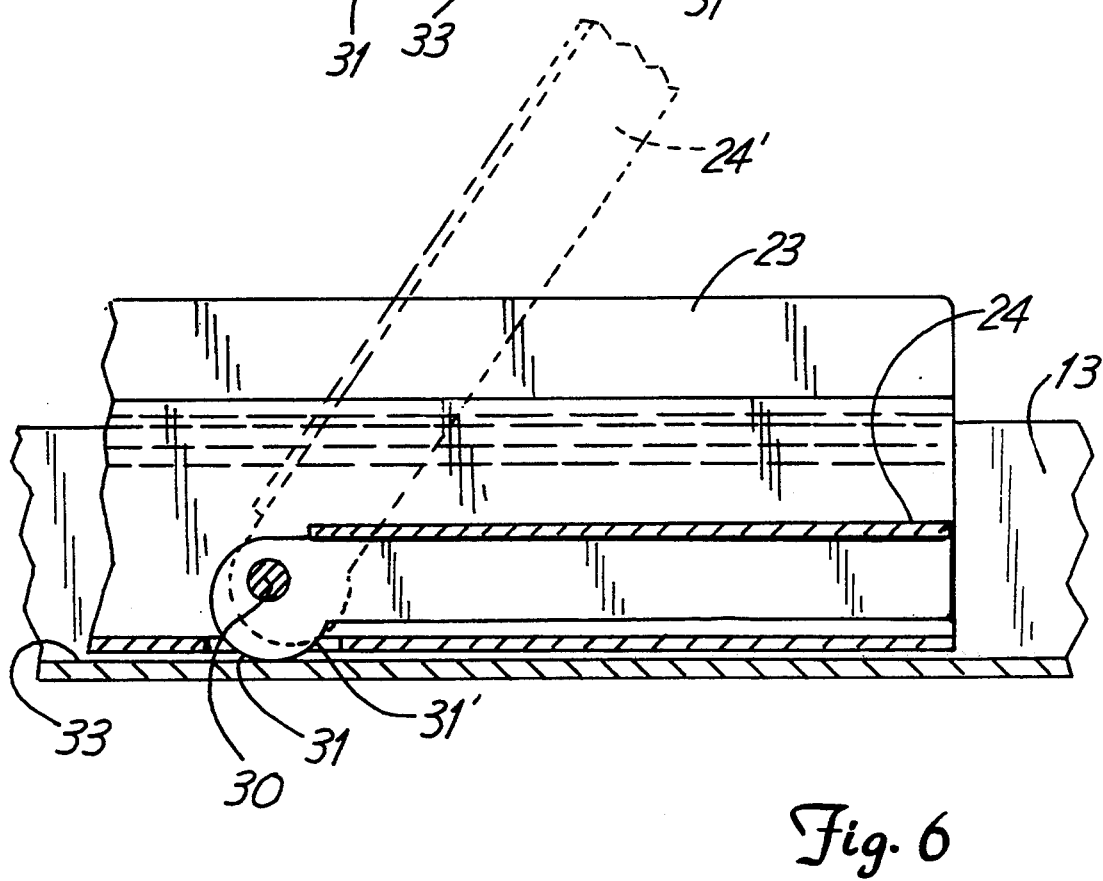
FIG. 6 shows a partial sectional view showing the wheel stop in locked position and, in phantom, in the unlocked position.

FIGS. 5 and 6 show in greater detail the means for moving movable stop 23 and for engaging tire channel 13 with movable channel 23 through the use of a hand lever mechanism that locks the flanges of the movable channel 23 to the flanges of the tire channel 13.

FIG. 5 shows hand lever 24 in the locked position. A pivot pin 30 which has one end extending through a first opening 40 in one side of movable U-shaped channel 23 and a second opening 41 extending through a second opening on the opposite side of channel 41 provides means for pivoting hand lever 24 thereabout. Pivot pin 30 allows for a pivoting motion of hand lever 24 between the lower locked position as shown in FIG. 6 and the upper unlocked position as shown in phantom in FIG. 6.

FIGS. 5 and 6 show that hand lever 24 connects to a fast cam 31 on one side of hand lever 24 and a second identical cam 31 on the opposite side of hand lever 24. Cams 31 are pivotally offset from the center of pivot pin 30. Thus, as hand lever 24 is brought to the down position, cams 31 engage surface 33 of channel which pushes channel member 23 upward, causing flange surface 26 on member 23b to engage lower flange surface 28 of channel 33 and flange surface 29 to engage flange surface 27 of member 23a. That is, frictional contact is produced between the two surfaces of the flanges which locks movable stop 21 to tire channel 13 to prevent movable wheel stop 21 from sliding forward or rearward.

To release movable wheel stop 21, one raises lever 24 to the top position indicated by phantom lever 24' which causes cams 31' to disengage from surface 33, by lowering moveable wheel stop 21 so that lateral flanges 13a and 13b are no longer in frictional engagement with flanges 23a and 23b on movable wheel stop 21. In this mode, movable wheel stop 21 can be slid from one position to another along tire channel 13. Thus, with the present invention, the movable wheel stop 21 can be positioned along tire channel 13 to accommodate bicycles of shorter or longer length. In addition the movable wheel stop 21 can be removed to allow a bicycle to be rolled off the tire channel 13. It will be appreciated that the only action required to move the moveable wheel stop 21 is for a user without the use of tools to raise and lower hand lever 24 which, in the lowered position, locks movable wheel stop 21 into position in fire channel 13 and in the upper position, allows movable wheel stop 21 to move freely along tire channel 13.

We claim:

1. A bicycle rack for supporting bicycles of different sizes in an upright position for viewing by a retail store customer comprising:

a frame;

a plurality of tire channels locate on said frame, said tire channels having a sidewall for laterally restraining a bicycle wheel therein;

a first wheel stop located on said tire channel;

a flange on said tire channel with said range extending laterally away from said tire channel, a movable wheel stop positionable along said tire channel, said movable wheel stop having a pivotal hand lever with a cam for securing the movable wheel stop to said tire channel, said hand lever operable for disengaging the movable wheel stop to permit a user to reposition the movable wheel stop to accommodate bicycles of different lengths by sliding the movable wheel stop to a different position on said tire channel and then locking the movable wheel stop in position by engaging the hand lever.

2. The bicycle rack of claim 1 including a plurality of tire channels located in a spaced and parallel relationship to each other for holding a plurality of bicycles therein.

3. The bicycle rack of claim 1 wherein said pivotal hand lever with said cam frictionally locks said movable wheel stop to said tire channel.

4. The bicycle rack of claim 3 including a double flange on said movable wheel stop with said double flange forming a pocket for interleafing with said tire channel flange so that the flange of wheel stop can be brought into frictional engagement with said tire channel flange.

5. The bicycle rack of claim 1 wherein said tire channel and said movable wheel stop have mating shapes to permit said movable wheel stop to be slid laterally along said tire channel.

6. A movable wheel stop for a bicycle rack, said movable wheel stop positionable along a tire channel without the use of any tools, said movable wheel stop comprising:

a channel member for sliding along a tire channel;

a pivotable hand lever;

a cam member located on said movable wheel stop to secure the movable wheel stop to the tire channel of a bicycle rack, said cam member having an offset center said pivotal hand lever movable between a position of engagement of the cam member with the tire channel to a position of disengagement of the movable wheel stop with the fire channel to permit a user to lock or unlock the movable wheel stop solely by use of the pivotable hand lever.

7. The movable wheel stop of claim 6 including double flanges which interleaf with flange on a tire channel.

8. The movable wheel stop of claim 6 wherein a pivot pin extends into said movable wheel stop to pivotally support said hand lever.

9. A movable wheel stop for a bicycle rack, said movable wheel stop positionable along a tire channel without the use of any tools, said movable wheel stop comprising:
- a channel member for sliding along the tire channel, said channel member having double flanges for interleafing with the tire channel;
- a pivotable hand lever;
- a cam member located on said movable wheel stop to secure the movable wheel stop to the tire channel of a bicycle rack, said pivotal hand lever movable between a position of engagement of the cam member with the tire channel to a position of disengagement of the movable wheel stop with the tire channel to permit a user to lock or unlock the movable wheel stop solely by use of the pivotable hand lever.

* * * * *